United States Patent
Liu et al.

(10) Patent No.: US 9,608,722 B2
(45) Date of Patent: Mar. 28, 2017

(54) METHOD AND APPARATUS FOR MEASURING QUALITY PARAMETERS OF OPTICAL TRANSMISSION CHANNEL

(71) Applicant: LUSTER LightWave Co., Ltd., Beijing (CN)

(72) Inventors: Weiqiang Liu, Beijing (CN); Yongpeng Zhao, Beijing (CN)

(73) Assignee: LUSTER LightWave Co., Ltd., Beijing (CN)

( * ) Notice: Subject to any disclaimer, the term of this patent is extended or adjusted under 35 U.S.C. 154(b) by 0 days.

(21) Appl. No.: 14/438,991

(22) PCT Filed: Oct. 28, 2013

(86) PCT No.: PCT/CN2013/086067
§ 371 (c)(1),
(2) Date: Apr. 28, 2015

(87) PCT Pub. No.: WO2015/018133
PCT Pub. Date: Feb. 12, 2015

(65) Prior Publication Data
US 2015/0304025 A1     Oct. 22, 2015

(30) Foreign Application Priority Data
Aug. 5, 2013    (CN) .......................... 2013 1 0337090

(51) Int. Cl.
    *H04B 10/06*       (2006.01)
    *H04B 10/079*      (2013.01)
    *H04B 10/2507*     (2013.01)

(52) U.S. Cl.
    CPC ... *H04B 10/0795* (2013.01); *H04B 10/07951* (2013.01); *H04B 10/07953* (2013.01); *H04B 10/2507* (2013.01)

(58) Field of Classification Search
    CPC .............. H04B 10/616; H04B 10/6161; H04B 10/611; H04B 10/6162; H04B 10/6164;
(Continued)

(56) References Cited

U.S. PATENT DOCUMENTS 7,149,428 B2    12/2006   Chung et al.
2009/0214201 A1*   8/2009   Oda .................... H04B 10/0795
                                                       398/25
(Continued)

FOREIGN PATENT DOCUMENTS

CN          1720680 A      1/2006
CN        102904635 A      1/2013
WO    WO 2007/082054 A2    7/2007

OTHER PUBLICATIONS

International Search Report (ISA/CN) for International Application No. PCT/CN2013/086067, mailed Apr. 30, 2014, 2 pages.

*Primary Examiner* — Hanh Phan
(74) *Attorney, Agent, or Firm* — Foley & Lardner LLP; Antoinette F. Konski

(57) ABSTRACT

The present invention discloses a method and an apparatus for measuring quality parameters of optical transmission channels. The apparatus comprises: a tunable optical filter for receiving an optical signal, performing wavelength or optical carrier demultiplexing on the optical signal, and out-of-band ASE noise suppression; an optical coherent receiver connected to the tunable optical filter, for performing polarization- and phase-diversity detection on the filtered optical signal and converting it into multiple lane baseband electrical signals; analog-to-digital converters for sampling and quantizing the multiple lane baseband electrical signals so as to convert the them into multiple lane digital signals; a digital signal processing module for processing the multiple lane digital signals to obtain quality parameters; and an display module for displaying the quality parameters.

(Continued)

By the device according to an embodiment of the invention, real-time measurement of various key performance parameters of the 40 Gbps, 100 Gbps and extra-100 Gbps (for example, 200 Gbps, 400 Gbps and 1 Tbps) coherent polarization-multiplexed system is achieved simultaneously, especially the issue of real-time measurement of the in-service in-band OSNR is solved. Therefore, the network operation and maintenance are facilitated and the cost of network operation and maintenance is saved.

6 Claims, 7 Drawing Sheets

(58) Field of Classification Search
CPC .............. H04B 10/6165; H04B 10/614; H04B 10/613; H04B 10/612
USPC ....... 398/202, 208, 204, 205, 206, 207, 209, 398/210, 212, 213, 214, 135, 136, 33, 38, 398/158, 159, 169, 25, 26, 27, 28, 183, 398/188, 184, 65, 152
See application file for complete search history.

(56) References Cited

U.S. PATENT DOCUMENTS

| | | | |
|---|---|---|---|
| 2010/0092168 A1* | 4/2010 | Li ...................... | H04B 10/0795 398/16 |
| 2010/0142943 A1* | 6/2010 | Frankel .............. | H04B 10/0795 398/25 |
| 2012/0002979 A1* | 1/2012 | Xie ...................... | H04B 10/611 398/208 |
| 2016/0065313 A1* | 3/2016 | Yu ...................... | H04L 25/0305 398/208 |

* cited by examiner

METHOD AND APPARATUS FOR MEASURING QUALITY PARAMETERS OF OPTICAL TRANSMISSION CHANNEL

CROSS-REFERENCE TO RELATED APPLICATIONS

This application is a national phase application under 35 U.S.C. §371 of International Application No. PCT/CN2013/086067, filed Oct. 28, 2013, which in turn claims priority to Chinese Application No. 201310337090.9, filed Aug. 5, 2013, the content of each of which is incorporated herein by reference in its entirety.

FIELD OF THE INVENTION

The present invention relates to a field of communication technologies, and in particular, to a method and a device for measuring quality parameters of optical transmission channels.

BACKGROUND OF THE INVENTION

Optical communications is entering an era of coherent detection. The 40 Gbps polarization-multiplexed binary (differential) phase shift keying (PM-(D) BPSK) and the 40 Gbps and 100 Gbps polarization-multiplexed quadrature (differential) phase shift keying (PM-(RZ) (D)QPSK) technologies are being deployed commercially. The coherent communication technology will be indispensable for future 200 Gbps, 400 Gbps and even 1 Tbps transmission systems. Presently, the 40 Gbps and 100 Gbps coherent systems are still in an initial deployment stage, and more and more coherent systems will be deployed in the dense wavelength division multiplexing (DWDM) networks. For the network operation and maintenance, the operator needs to monitor the in-service performance parameters of the coherent systems, for example, the optical signal-to-noise ratio (OSNR), the dispersion, the polarization mode dispersion and the polarization dependent loss, during the real-time transmission.

The in-band OSNR is one of the important performance parameters of the coherent systems, and the in-band OSNR in-service measurement is the main issue to be solved for the deployment, operation and maintenance of the current 100 Gbps PM-QPSK and the future beyond-100 Gbps (200 Gbps, 400 Gbps and 1 Tbps) coherent polarization-multiplexed systems. A method for measuring the OSNR in the prior art is an optical spectrum analyzer (OSA)-based linear interpolation noise estimation method, in which it is assumed that no spectrum overlap exists between neighboring DWDM channels and the power in the middle between the adjacent channels is regarded as the ASE noise power. By measuring the noise power of the wavelength at the middle of two neighboring channels and by performing a linear interpolation, the ASE noise power of the channel to be measured is determined. The signal power is obtained by subtracting the noise power from the power level measured at the center wavelength of the channel; thereby the in-band OSNR may be calculated. Another method for measuring the in-band OSNR is an OSA-based signal ON-OFF method, in which the measurement of the signal power is the same as in the foregoing linear interpolation method, however, during the measurement of the noise power, the signal laser is switched off, and thus the measured optical power at the center wavelength of the channel on the OSA is the ASE noise power. Since the EDFA ASE noise level will change as the signal is on and off, the measured noise power is over-estimated. Such an error may be corrected by further calibration. Further, another method for measuring the in-band OSNR is the polarization extinction/nulling method, in which the method utilizes the properties that the signal is polarized and the ASE noise is non-polarized, and employs a polarizing beam splitter PBS to split a signal into two orthogonal polarization components and finally to use OSAs to measure their spectrum respectively. By adjusting a polarization controller to align the polarization state of the input signal with one of the main polarization axis (e.g. slow axis) of the PBS, in this case the signal in the other polarization direction will be totally eliminated and only the noise remains. Then the powers at the center wavelength of the channel in the two polarization directions are measured, respectively, where the optical power level measured in the polarization direction where the signal is extinguished is a half of the ASE noise power, and the optical power level measured in the other polarization direction is the sum of the half of the ASE noise power and the power of signal. Thereby, the power of the signal and the ASE noise may be calculated, accordingly.

Those methods in the prior art have the following issues:

1) In the non-coherent 40 Gbps and coherent 100 Gbps systems, the signal bandwidth exceeds the channel grid (i.e. 50 GHz) of dense wavelength division multiplexing system defined by International Telecommunications Union (ITU). The spectra of adjacent DWDM channels overlap with each other, thus the ASE noise in the middle between neighboring DWDM channels is shielded by the signal. Therefore, the actual ASE noise power cannot be measured accurately by the traditional OSA based noise interpolation method.

2) Although such an issue may be solved by the signal ON-OFF method, it needs to interrupt the service during the measurement, and thus an in-service measurement is impossible.

3) The polarization extinction method can solve the above issues, but the coherent 100 Gbps and beyond-100 Gbps polarization-multiplexed signals, for example, PM-QPSK signals, has two orthogonal polarization states, thus the signal and the noise cannot be separated by the polarization extinction method, thereby the method is no longer applicable.

4) Although a transmission line-card has integrated a function of real-time performance monitoring, it can only measure the end-to-end channel quality and performance parameters, and there is no way to measure the channel parameters of a transmission link between terminals. Therefore, for the 100 Gbps and beyond-100 Gbps coherent polarization-multiplexed systems, an effective method is required for measuring the parameters of the in-band OSNR in-service.

SUMMARY OF THE INVENTION

An objective of the present invention is to solve at least one of the above-mentioned technical issues.

Therefore, it is an objective of the present invention to provide a system for measuring quality parameters of optical transmission channels.

It is a further objective of the present invention to provide a method for measuring quality parameters of optical transmission channels.

To attain the above objectives, an embodiment according to one aspect of the present invention provides an apparatus for measuring quality parameters of optical transmission channels and the apparatus comprises: a tunable optical filter for processing an incoming optical signal, performing wavelength or optical carrier demultiplexing and out-of-band ASE noise suppression; an optical coherent receiver connected to the above mentioned tunable optical filter, for performing polarization- and phase-diversity detection of the optical signal from the tunable optical filter and converting it into multiple lane baseband electrical signals; one or multiple analog-to-digital converters connected to the optical coherent receiver for converting the multiple lane baseband electrical signals from the coherent receiver into multiple lane digital signals; a digital signal processing module connected to the analog-to-digital converters, for processing the multiple lane digital signals to obtain the quality parameters of an optical transmission channel; and an output module for displaying the quality parameters of the optical transmission channel.

By the apparatus according to an embodiment of the present invention, the issue of measuring various key in-service performance parameters of the 40 Gbps, 100 Gbps and beyond-100 Gbps coherent polarization-multiplexed systems are solved. In particular, the issue of measuring the in-band OSNR in-service is solved, which facilitates the network operation and maintenance, and saves the cost of network operation and maintenance.

In an embodiment of the present invention, the apparatus may further comprises: an optical amplifier connected to the tunable optical filter, for enhancing the optical signal power to the tunable optical filter, once the received optical power of the signal is below the sensitivity of the optical coherent receiver.

In an embodiment of the present invention, the quality parameters of the optical transmission channels may include dispersion, polarization mode dispersion, optical signal-to-noise ratio and polarization dependent loss.

In an embodiment of the present invention, the digital signal processing module may comprise: a dispersion estimator for estimating an accumulated dispersion value from the multiple lane digital signals; a polarization mode dispersion estimator for estimating a polarization mode dispersion value from the multiple lane digital signals; an optical signal-to-noise ratio estimator for estimating optical signal-to-noise ratio from the multiple lane digital signals; and a polarization dependent loss estimator for estimating polarization dependent loss value from the multiple lane digital signals.

To attain the above objectives, an embodiment according to another aspect of the present invention provides a method for measuring quality parameters of optical transmission channels and the method comprises the steps of: receiving an optical signal and performing wavelength demultiplexing and out-of-band ASE noise suppression on the optical signal; performing polarization- and phase-diversity detection of the received optical signal and converting it into multiple lane baseband electrical signals; sampling and quantizing the multiple lane baseband electrical signals so as to convert them into multiple lane digital signals; processing the multiple lane digital signals to obtain the quality parameters of the optical transmission channel, and displaying the quality parameters of the optical transmission channel in an user interface.

By the method according to an embodiment of the present invention, the issues of real-time measurement of various key performance parameters of the 40 Gbps, 100 Gbps and beyond-100 Gbps coherent polarization-multiplexed system is solved. In particular, the issue of real-time monitoring of the in-band OSNR is solved. Moreover, the network operation and maintenance are facilitated and the cost of network operation and maintenance is saved.

In an embodiment of the present invention, the method further comprises: optical signal amplification, when an optical power of the optical signal is below the sensitivity of an optical coherent receiver.

In an embodiment of the present invention, the quality parameters of the optical transmission channel include dispersion, polarization mode dispersion, optical signal-to-noise ratio and polarization dependent loss.

In an embodiment of the present invention, the processing of the multiple lane digital signals to obtain quality parameters of the optical transmission channel comprises: estimating a dispersion value by a dispersion estimator from the multiple lane digital signals; estimating a polarization mode dispersion value by a polarization mode dispersion estimator from the multiple lane digital signals; estimating an optical signal-to-noise ratio by an optical signal-to-noise ratio estimator from the multiple lane digital signals; and estimating a polarization dependent loss value by a polarization dependent loss estimator according to the multiple lane digital signals.

Additional aspects and advantages of the present invention will be given in part in the description below, and part of them will be apparent from the description below or will be understood from the practicing of the present invention.

BRIEF DESCRIPTION OF THE DRAWINGS

The above-mentioned and/or additional aspects and advantages of the present invention will be apparent and easy to understand from the description of the embodiments below in conjunction with the drawings, in which.

DETAILED DESCRIPTION OF THE EMBODIMENTS

Figure 1:
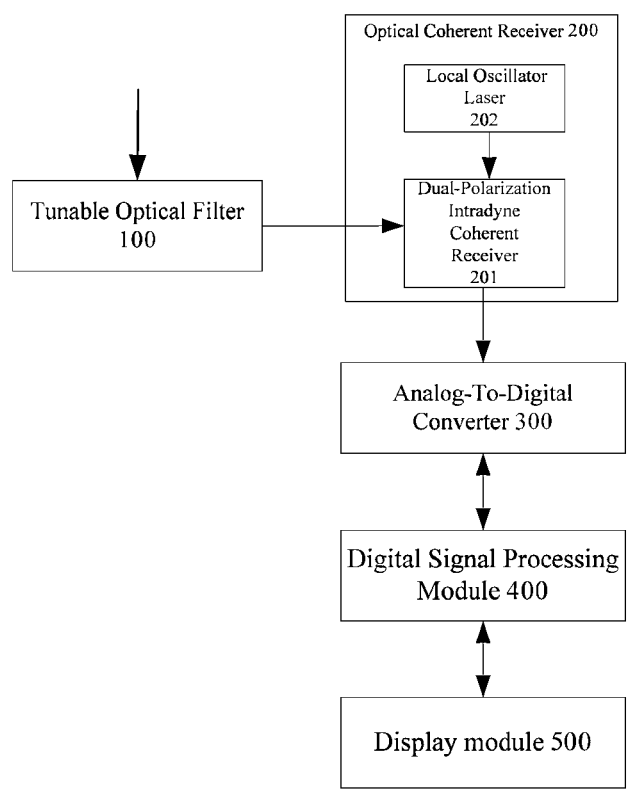
FIG. 1 is an illustration of an apparatus for measuring quality parameters of the optical transmission channel according to an embodiment of the invention.

The embodiments of the invention will be described in detail below, and examples of the embodiments will be shown in the drawings, in which the same or similar elements or elements with the same or similar functions will be represented by the same or similar labels throughout. The embodiments described below with reference to the drawings are exemplary for explaining the invention only, rather than being construed as limiting the invention.

In the description of the invention, it should be understood that, terms "first" and "second" are only used for the purpose of description, rather than being construed as indicating or implying relative importance or implying the number of technical features indicated. Thereby, the features defined by "first" or "second" may explicitly or implicitly include one or more such features. In the description of the invention, unless otherwise defined explicitly and specifically, the term "a plurality of" means two or more.

FIG. 1 is an illustration of an apparatus for measuring quality parameters of an optical transmission channel according to an embodiment of the invention. As shown in FIG. 1, the apparatus for measuring quality parameters of the optical transmission channel according to the embodiment of the invention includes a tunable optical filter 100, an optical coherent receiver 200, analog-to-digital converters 300, a digital signal processing module 400 and a display module 500.

Among them, the tunable optical filter 100 is used for performing wavelength or optical carrier demultiplexing on the optical signal, and out-of-band ASE noise suppression.

The optical coherent receiver 200 consists of a dual-polarization intradyne coherent receiver 201 and an optical local oscillator laser 202, where the dual-polarization intradyne coherent receiver may be implemented according to OIF standard IA#OIF-DPC-RX-01.1. The optical local oscillator laser 202 is a tunable laser, which is connected to the dual-polarization intradyne coherent receiver 201 and is used as a local optical oscillator providing local reference frequency and phase for the incoming optical signal to be measured. The optical coherent receiver 200 is connected to the tunable optical filter by the intradyne coherent receiver 201, and is used for performing polarization and phase diversity detection on the optical signal coming from the tunable optical filter and converting it into multiple lane baseband electrical signals. The optical coherent receiver 200 may consist of one or more dual-polarization intradyne coherent receivers 201 and local oscillator lasers 202.

The analog-to-digital converters 300 are used for sampling and quantizing the multiple lane baseband electrical signals so as to convert them into multiple lane digital signals. The analog-to-digital converters 300 may operate in a burst mode, in which each time every analog-to-digital converter may transfer a block of data to the digital signal processing module 400 and then collects and processes the next block of data.

The digital signal processing module 400 is connected to the analog-to-digital converters and is used for processing the multiple lane digital signals from the analog-to-digital converters to obtain the quality parameters of the optical transmission channel. The quality parameters of the optical transmission channel include dispersion, polarization mode dispersion, optical signal-to-noise ratio and polarization dependent loss.

In an embodiment of the invention, the digital signal processing module 400 includes a dispersion estimator 410, a polarization mode dispersion estimator 420, an optical signal-to-noise ratio estimator 430 and a polarization dependent loss estimator 440.

Among them, the dispersion estimator 410 is used for estimating a dispersion value from the multiple lane digital signals. The dispersion estimator estimates the dispersion value by means of a function of a timing tone and a dispersion equalization filter. Moreover, the dispersion estimator 410 employs a blind estimation algorithm to improve the estimation accuracy by a plurality of iterations.

The polarization mode dispersion estimator 420 is used for estimating a polarization mode dispersion value from the multiple lane digital signals.

The optical signal-to-noise ratio estimator 430 is used for estimating an optical signal-to-noise ratio from the multiple lane digital signals.

The polarization dependent loss estimator 440 is used for estimating a polarization dependent loss value from the multiple lane digital signals.

The display module 500 is used for displaying the quality parameters of the optical transmission channel.

Figure 2:
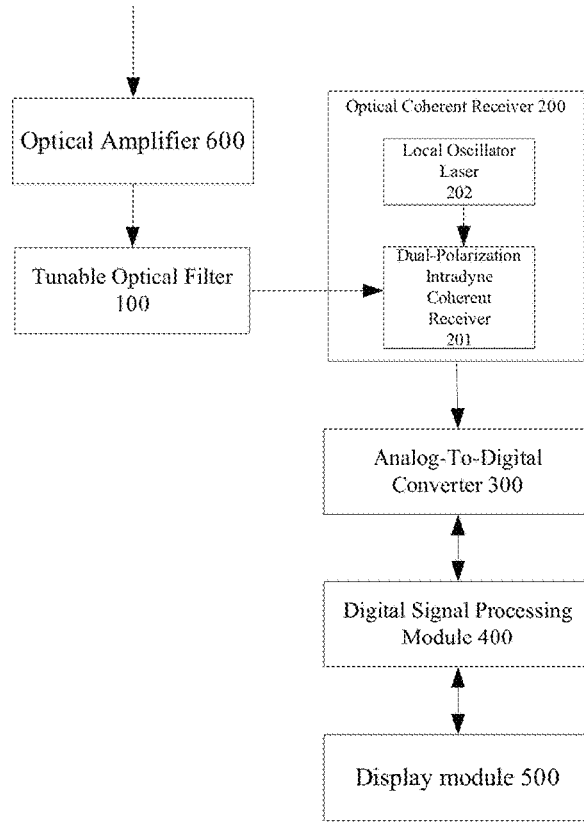
FIG. 2 is an illustration of an apparatus for measuring quality parameters of the optical transmission channel according to another embodiment of the invention.

FIG. 2 is an illustration of an apparatus for measuring quality parameters of the optical transmission channel according to another embodiment of the invention. As shown in FIG. 2, the apparatus for measuring the quality parameters of the optical transmission channel according to the embodiment of the invention further includes an optical amplifier 600. The optical amplifier 600 is connected to the tunable optical filter 100, and used for amplifying the optical signal when the optical power of the optical signal is below the sensitivity of the optical coherent receiver 200, and delivering the amplified optical signal to the optical tunable filter 100.

Figure 3:
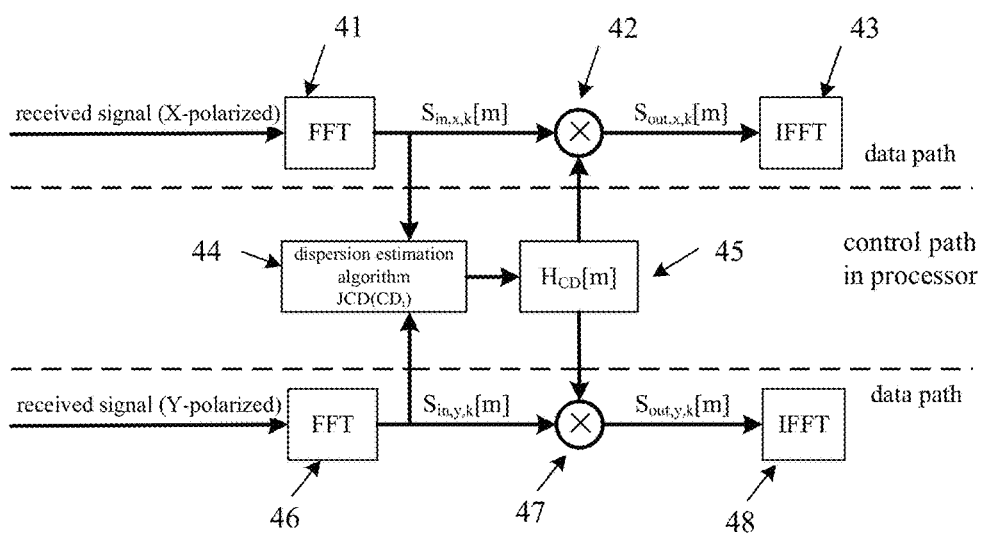
FIG. 3 is a schematic illustration of the dispersion value estimation according to an embodiment of the invention.
Figure 4:
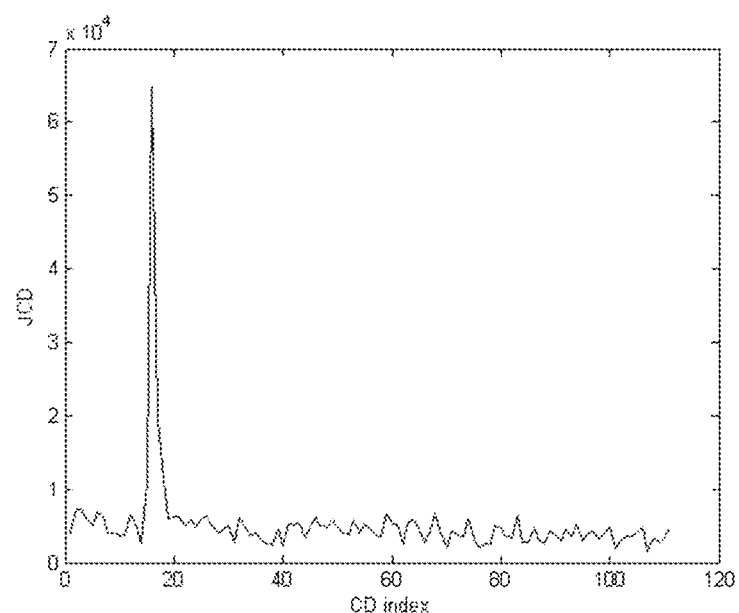
FIG. 4 is an illustration of a dispersion estimation result according to an embodiment of the invention.

In one embodiment of the invention, the dispersion value is estimated by the dispersion estimator 100 using properties of the obtained timing tone of the optical signal. In a method for extracting the timing tone, for example, a Godard method, an autocorrelation function of a frequency spectrum of the received optical signal is used. On the Nyquist frequency, the autocorrelation function includes two timing tones. These timing tones contain the symbol rate information, and their amplitude is strongly correlated to the residual dispersion value. FIG. 3 is a schematic illustration of the dispersion estimation according to an embodiment of the invention. As shown in FIG. 3, after passing through a series of dispersion equalization filters (HCD[m] as shown in FIG. 3), the dispersion value corresponding to an amplitude of the autocorrelation function of the received signal reaching a maximum value is the dispersion value ($CD_i$) to be estimated, an estimation result of which is shown in FIG. 4.

A decision function used for estimating the dispersion value is applicable for the sampled signal that was subjected to the analog-digital conversion. The decision function JCD ($CD_i$) is defined as:

$$JCD(CD_i) = \sum_{k=1}^{N_1} |U_{k,Re}(CD_i)|, \qquad \text{-Formula (1)}$$

where $U_{k,Re}(CD_i)$ is the real part of the autocorrelation function of the received $k^{th}$ data packet, and $JCD(C_i)$ is an average value of $N_1$ numbers of successive Fast Fourier Transform (FFT) array elements (if oversampling is used, that is, each symbol is sampled twice, it refers to the Nyquist frequency). Considering the influence of the polarization effect on the amplitude value of the timing tone, herein the autocorrelation function is simplified as:

$$|U_{k,Re}(CD_i)| = |\Sigma \Re\{SF_{xA}\} \cdot * \Re\{SF_{xB}\}| + |\Sigma \Re\{SF_{yA}\} \cdot * \Re\{SF_{yB}\}| + |\Sigma \Re\{SF_{xA}+SF_{yA}\} \cdot * \Re\{SF_{xB}+SF_{yB}\}| + |\Sigma \Re\{SF_{xA}-SF_{yA}\} \cdot * \Re\{SF_{xB}-SF_{yB}\}| \qquad \text{Formula (2),}$$

where $SF_{xA}$, $SF_{xB}$, $SF_{yA}$ and $SF_{yB}$ are respectively as follows:

$$SF_{xA}=S_{in\_x,k}[(FFTSize/4-\Delta:FFTSize/4+\Delta)+FFTSize/2] \quad \text{Formula (3),}$$

$$SF_{xB}=S_{in\_x,k}[FFTSize/4-\Delta:FFTSize/4+\Delta] \quad \text{Formula (4),}$$

$$SF_{yA}=S_{in\_y,k}[(FFTSize/4-\Delta:FFTSize/4+\Delta)+FFTSize/2] \quad \text{Formula (5),}$$

$$SF_{yB}=S_{in\_y,k}[FFTSize/4-\Delta:FFTSize/4+\Delta] \quad \text{Formula (6),}$$

Where a discrete frequency index after the Fast Fourier Transform (FFTSize/4−Δ:FFTSize/4+Δ) refers to the frequency spectrum of the digital signal divided by FFTSize numbers of samples. FFTSize is the number of sampling points that participate in the FFT operation. $S_{in\_x,k}$ and $S_{in\_y,k}$ are frequency domain signals that the digital signal sequences in x and y polarization directions are subjected to the FFT transform after the ADC sampling, where k is an index value of the data packet; $\Re$ is an operation for the real part; and Δ is a frequency resolution.

Figure 5:
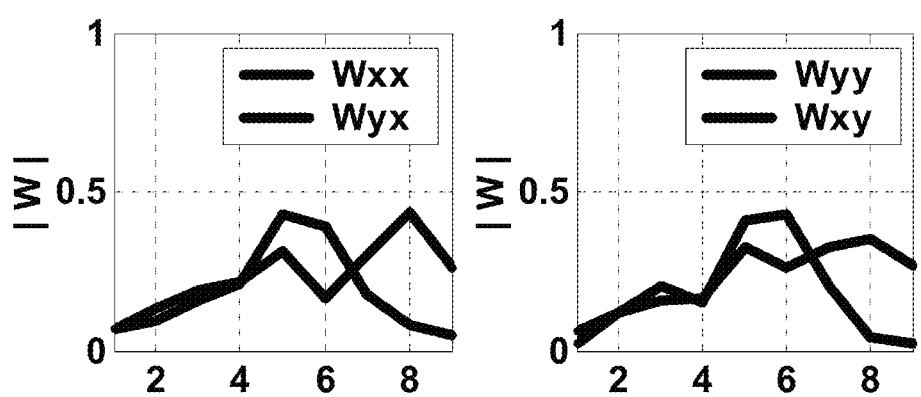
FIG. 5 is an illustration of a tap coefficient of an equalizer in a polarization mode dispersion estimator according to an embodiment of the invention.

In one embodiment of the invention, after the multiple-input and multiple-output equalizer converges, a tap coefficient of the filter may be obtained, as shown in FIG. 5. A value of differential group delay DGD may be estimated from the tap coefficients $W_{xx}$ and $W_{yx}$, or $W_{yy}$ and $W_{xy}$.

$$DGD_x = \left|\sum_{k=1}^{L} k \cdot W_{xx}(k) - \sum_{k=1}^{L} k \cdot W_{yx}(k)\right|, \quad \text{-Formula (7)}$$

$$DGD_y = \left|\sum_{k=1}^{L} k \cdot W_{yy}(k) - \sum_{k=1}^{L} k \cdot W_{xy}(k)\right|, \quad \text{-Formula (8)}$$

where in Formulae (7) and (8), L is a tap number of the filter, $W_{xx}(k)$, $W_{yx}(k)$, $W_{yy}(k)$ and $W_{xy}(k)$ are the coefficients of the $k^{th}$ tap. In order to get more accurate estimation of the differential group delay, averaging is employed, that is:

$$DGD = \frac{DGD_y + DGD_y}{2}, \quad \text{-Formula (9)}$$

A statistical distribution of the polarization mode dispersion may be obtained from a histogram of the differential group delay DGD within a period of time (for example, 24 hours).

Hereinafter, a specific solution of an on-off keying (OOK) optical signal-to-noise ratio estimator for 10 Gbps or below is described. It is assumed that y(t) represents a recovered observation signal; x(t) represents the optical signal, n(t) represents the noise; o(t) represents an output of the intensity detection; and x*(t) and n*(t) represent complex conjugates of x(t) and n(t), respectively.

$$o(t) = [x(t) + n(t)][x^*(t) + n^*(t)] \quad \text{-Formula (10)}$$
$$= x(t) \cdot x^*(t) + x(t) \cdot n^*(t) + x^*(t) \cdot n(t) + n(t) \cdot n^*(t)$$

The signal: $S(t)=x(t)\cdot x^*(t)$ \quad Formula (11)

The ASE beat noise:

$$N(t) \approx x(t)\cdot n^*(t) + x^*(t)\cdot n(t) = 2|x(t)||n(t)|\cos(\phi_x - \phi_n) \quad \text{Formula (12),}$$

where $\phi_x$ is a phase of the signal x(t), and $\phi_n$ is a phase of the ASE noise.

The signal power: $\overline{S^2} = \overline{|x^4|}$ \quad Formula (13)

The noise power: $\overline{N^2} = 2\overline{|x^2|\cdot|n^2|}$ \quad Formula (14)

The signal-to-noise ratio:

$$SNR = \frac{\text{signal power}}{\text{Noise power}} \approx \frac{\overline{|x^2|}}{\overline{|n^2|}} \cdot \frac{1}{2} \quad \text{-Formula (15)}$$

The optical signal-to-noise ratio:

$$OSNR = \frac{\text{signal power (in 50 GHz)}}{\text{Noise power (in 0.1 nm)}} = 4SNR \quad \text{-Formula (16)}$$

The SNR may be calculated from the frequency spectrum:

$$R = \frac{\int_{f_0-25GHz}^{f_0+25GHz} |y(f)|^2 \, df}{\int_{f_0-25GHz}^{f_0+25GHz} |n(f)|^2 \, df} = \quad \text{-Formula (17)}$$

$$\frac{\int_{f_0-25GHz}^{f_0+25GHz} (|x(f)|^2 + |n(f)|^2) \, df}{\int_{f_0-25GHz}^{f_0+25GHz} |n(f)|^2 \, df} =$$

$$\frac{\int_{f_0-25GHz}^{f_0+25GHz} |x(f)|^2 \, df}{\int_{f_0-25GHz}^{f_0+25GHz} |n(f)|^2 \, df} + 1 = \frac{SNR}{2} + 1,$$

$|y(f)|^2$ represents the overall power spectrum of the received signal, which includes a signal power spectrum and an ASE noise power spectrum $|n(f)|^2$.

Thereby, the optical signal-to-noise ratio OSNR may be calculated:

$$OSNR(dB) \approx 10 \cdot \log(R-1) + 9 \text{ dB} \quad \text{Formula (18)}$$

In an embodiment of the invention, a specific solution of a polarization-multiplexed binary phase shift keying (BPSK) (the optical signal bandwidth <50 GHz) optical signal-to-noise ratio estimator is described as follows. The optical signal-to-noise ratio is estimated based on the signal-to-noise ratio after the multiple-input and multiple-output equalizer converges:

$$SNR = 10 \cdot \log_{10} \frac{P_s(50 \text{ GHz})}{P_n(50 \text{ GHz})} = \quad \text{-Formula (19)}$$

$$10 \cdot \log_{10} \frac{P_s(50 \text{ GHz})}{4 \times P_n(12.5 \text{ GHz})} = OSNR - 6 \text{ dB,}$$

where $P_s$ is the signal power and $P_n$ is the ASE noise power.

Figure 6:
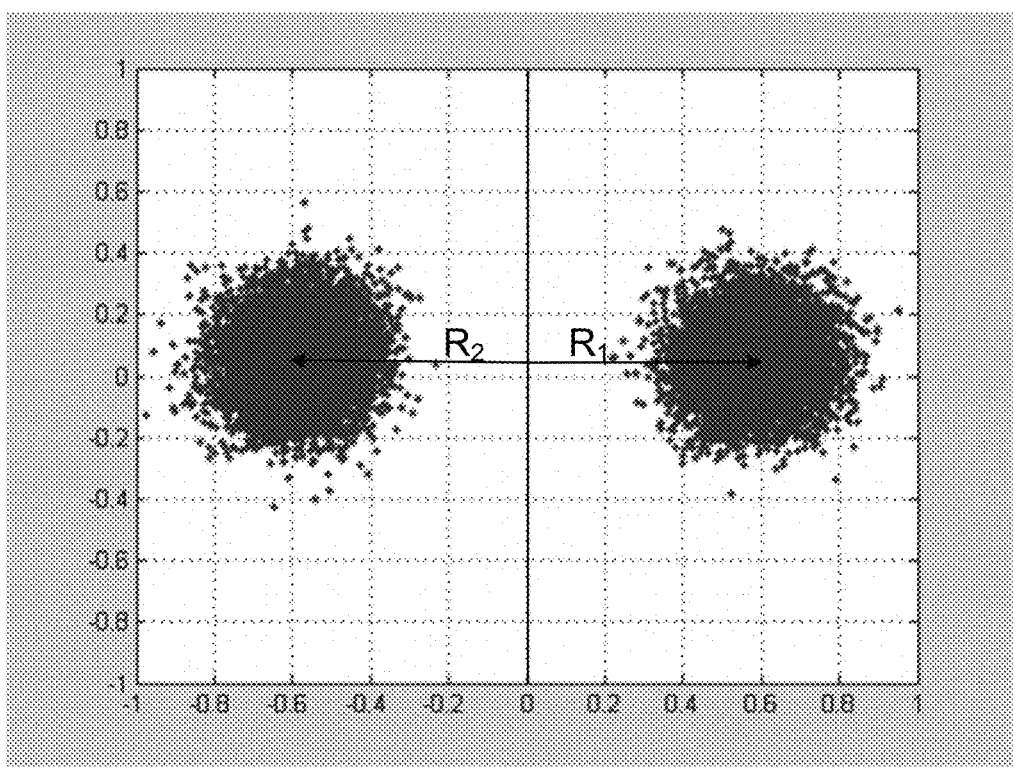
FIG. 6 is an illustration of the acquired constellation of the 40 Gbps BPSK signal according to an embodiment of the invention.
Figure 7:
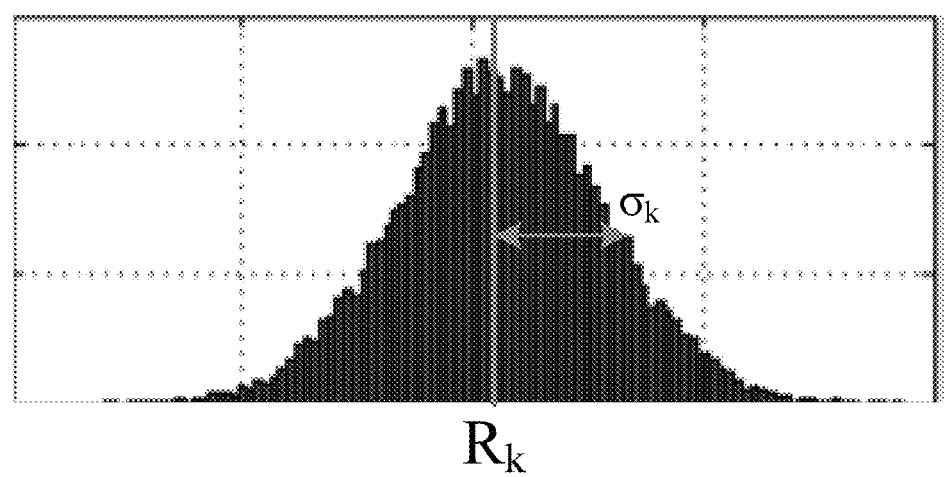
FIG. 7 is an illustration of the statistical histogram of the 40 Gbps BPSK and the 40 Gbps and 100 Gbps (D)QPSK signals according to an embodiment of the invention.

OSNR=SNR+6 dB+γ-Formula (20), where γ is a correction factor in consideration of linear effects such as narrow band filtering of optical comb filters and reconfigurable optical add-drop multiplexers (ROADM). In the polarization-multiplexed binary phase shift keying (PM-BPSK), after the MIMO equalizer converges and the carrier is recovered, a binary phase shift keying (BPSK) constellation may be obtained. The recovered signal and the distance distribution of the expected constellation center may be obtained from the histogram. The signal-to-noise ratio may be estimated by the formula below:

$$SNR = \frac{R_1^2 + R_2^2}{\sigma_1^2 + \sigma_2^2} \cdot \eta,\qquad \text{-Formula (21)}$$

where $R_1$ and $R_2$ are the amplitudes of the two symbols of BPSK, respectively; $\sigma_1$ and $\sigma_2$ represent the root-mean-square noises of the two symbols, respectively; and $\eta$ is a correction factor in consideration of non-linear effects during transmission. FIG. 6 is an illustration of the constellation of the 40 Gbps BPSK signal according to an embodiment of the invention. FIG. 7 is a statistical histogram of the 40 Gbps BPSK signal and the 40 Gbps and 100 Gbps QPSK signals according to an embodiment of the invention.

A specific solution of a quadrature phase shift keying (QPSK) optical signal-to-noise ratio estimator is described as follows. The optical signal-to-noise ratio is estimated based on the signal-to-noise ratio after the multiple-input and multiple-output equalizer converges:

$$SNR = 10 \cdot \log_{10} \frac{P_s(50 \text{ GHz})}{P_n(50 \text{ GHz})} = \qquad \text{-Formula (22)}$$
$$10 \cdot \log_{10} \frac{P_s(50 \text{ GHz})}{4 \times P_n(12.5 \text{ GHz})} = OSNR - 6 \text{ dB},$$

OSNR=SNR+6 dB+γ—Formula (23), where γ is a correction factor in consideration of linear effects such as narrow band filtering of optical comb filters and reconfigurable optical add-drop multiplexers (ROADM). In the polarization-multiplexed quadrature phase-shift keying (PM-QPSK), after the MIMO equalizer converges and the carrier is recovered, a QPSK constellation may be obtained. The recovered signal and the distance distribution of the expected constellation center may be obtained from the histogram. The signal-to-noise ratio may be estimated by the formula below:

$$SNR = \frac{R_1^2 + R_2^2 + R_3^2 + R_4^2}{\sigma_1^2 + \sigma_2^2 + \sigma_3^2 + \sigma_4^2} \cdot \eta,\qquad \text{-Formula (21)}$$

where $R_i$ is the amplitude of the $i^{th}$ symbol on the constellation and $\sigma_i$ is the root-mean-square noise of the $i^{th}$ symbol on the constellation.

Figure 8:
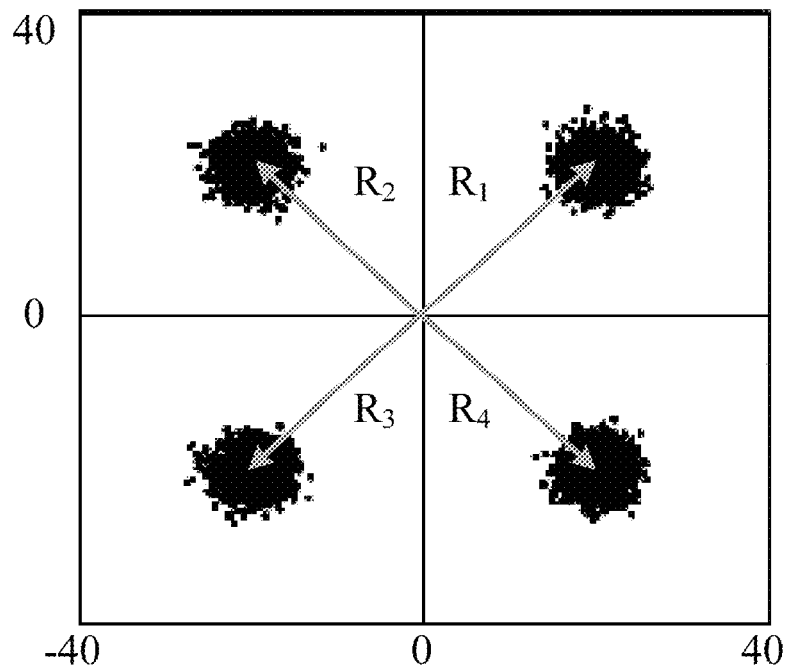
FIG. 8 is an illustration of the obtained constellation of the 40 Gbps and 100 Gbps PM-QPSK signals according to an embodiment of the invention.
Figure 8:
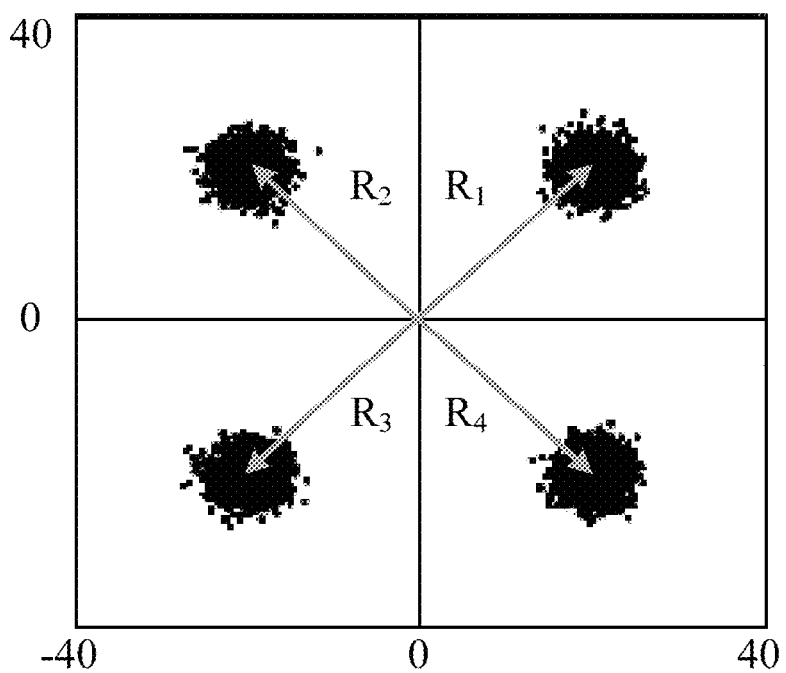

FIG. 8 is a constellation of the 40 Gbps and 100 Gbps PM-QPSK signals according to an embodiment of the invention. For the constellations of X-polarization and the Y-polarization, $R_1$, $R_2$, $R_3$ and $R_4$ are shown in FIG. 8.

In an embodiment of the invention, a specific solution of a quadrature phase-shift keying (QPSK) polarization dependent loss estimator is as follows. It is assumed that the power level in two polarization directions of a transmitter is same and the noise power has no polarization dependency. The polarization dependent loss may be estimated by determining a difference between the optical signal-to-noise ratios in the two polarization directions, which may be represented by the formula below:

$$PDL = |SNR_x - SNR_y| =$$
$$10 \cdot \log_{10}\left\{\frac{R_{x,1}^2 + R_{x,2}^2 + R_{x,3}^2 + R_{x,4}^2}{\sigma_{x,1}^2 + \sigma_{x,2}^2 + \sigma_{x,3}^2 + \sigma_{x,4}^2} \cdot \frac{\sigma_{y,1}^2 + \sigma_{y,2}^2 + \sigma_{y,3}^2 + \sigma_{y,4}^2}{R_{y,1}^2 + R_{y,2}^2 + R_{y,3}^2 + R_{y,4}^2}\right\},$$

Where $SNR_x$ is the signal-to-noise ratio of the x-polarized signal; $SNR_y$ is the signal-to-noise ratio of the y-polarized signal; $R_{x,1}$, $R_{x,2}$, $R_{x,3}$ and $R_{x,4}$ are amplitudes of the four x-polarized symbols, respectively; $R_{y,1}$, $R_{y,2}$, $R_{y,3}$ and $R_{y,4}$ are amplitudes of the four y-polarized symbols, respectively; $\sigma_{x,1}$, $\sigma_{x,2}$, $\sigma_{x,3}$ and $\sigma_{x,4}$ are root-mean-square noises of the four x-polarized symbols, respectively; and $\sigma_{y,1}$, $\sigma_{y,2}$, $\sigma_{y,3}$ and $\sigma_{y,4}$ are the root-mean-square noises of the four y-polarized symbols, respectively.

Figure 9:
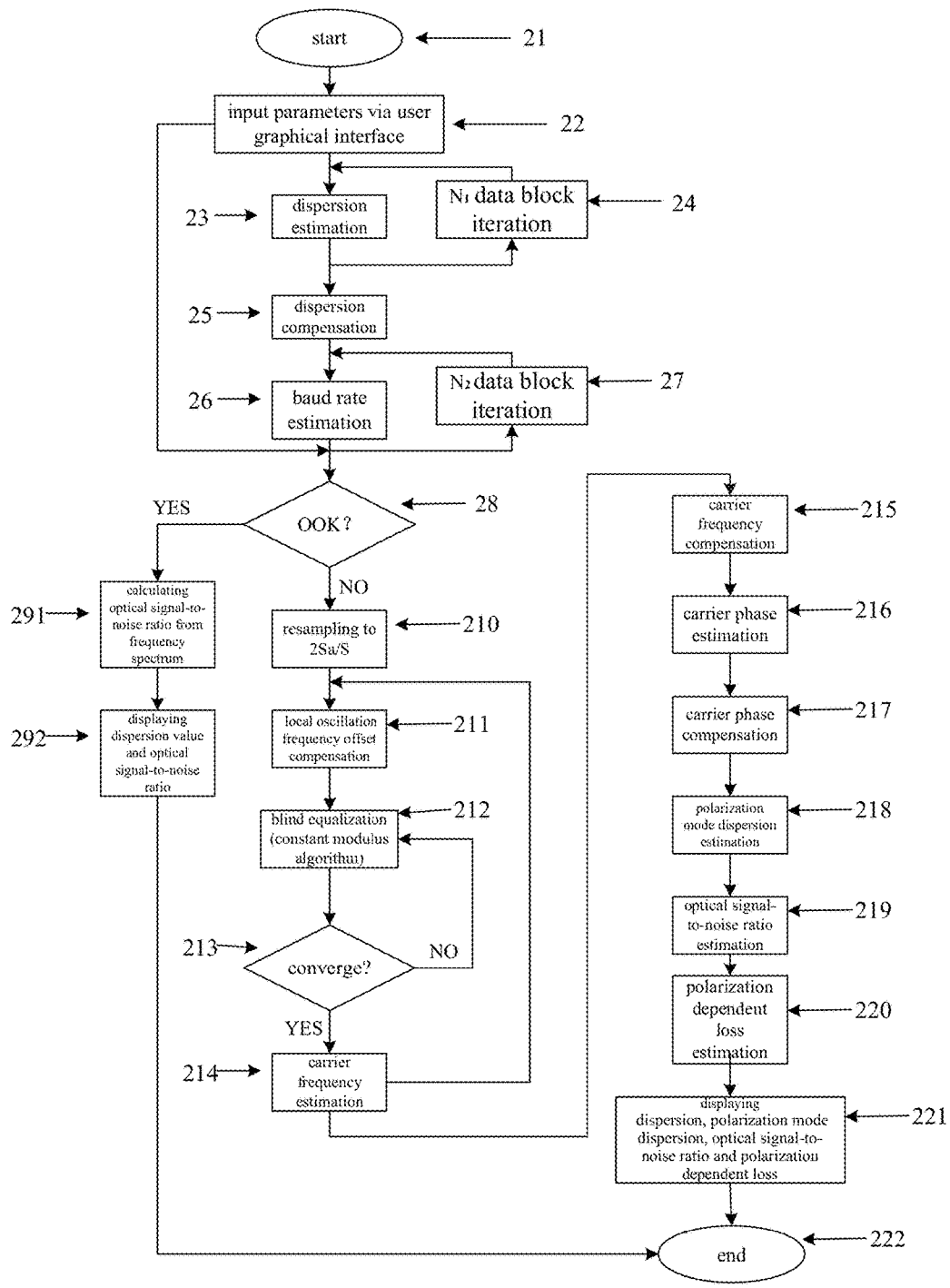
FIG. 9 illustrates a flow chart of a process for obtaining quality parameters of optical transmission channels according to an embodiment of the invention.

FIG. 9 illustrates a working flow chart of a process in which a digital signal processing module obtains quality parameters of the optical transmission channel according to an embodiment of the invention. The sampling rate of the analog-to-digital converters should be twice of the baud rate of the signal to be tested. The digital signal processing module 400 further includes a digital signal processor, for example, an ARM processor, or a digital signal processor from TI Corporation. The digital signal processing module 400 may operate in a burst mode.

As shown in FIG. 9, after the process starts (21), the required parameters are input via a user graphical interface (22). A blind estimation of the dispersion is performed by employing the dispersion estimation solution of FIG. 3 (23), and the estimation accuracy is improved via $N_1$ numbers of iterations (24). After a dispersion value is obtained, the digital signal processing module compensates for the dispersion induced distortion (25). Then, a timing tone is recovered to estimate the timing frequency, which should equal to the baud rate. An accurate baud rate is obtained (26) via $N_2$ numbers of iterations (27), where the accuracy also depends on the frequency resolution/the size of the fast Fourier transform employed. It is judged whether the optical signal is a 10 Gbps on-off keying (OOK) signal (28), and if the baud rate is 10 Gbps and the known modulation mode is OOK, the optical signal-to-noise ratio is calculated from the frequency spectrum (291), and the dispersion value and the optical signal-to-noise ratio of the 10 Gbps OOK signal are displayed (292). If the known modulation mode is not OOK, after obtaining the baud rate, the difference between twice of the baud rate and the sampling frequency it is calculated, and a re-sampling module performs interpolation on the sample array to have a sampling rate of 2 sample/symbol (210). Thereafter, optical local oscillation frequency offset compensation is performed (211). A blind equalization based constant modulus algorithm (212) is used to track the polarization state and compensate for polarization mode dispersion. It is judged whether the equalizer converges (213). If the equalizer converges, that is, the blind equalization is done, a blind carrier recovery algorithm (for example, the Viterbi algorithm) is used to estimate the carrier frequency (214) and carrier phase (216), and further to compensate for the carrier frequency offset (215) and the carrier phase offset (217). A value of differential group delay (DGD) may be estimated from the tap coefficients of four multiple-input and multiple-output filters, and an accurate estimation of the polarization mode dispersion is obtained by averaging the DGD value of two polarization states, that is, the X-polarization state and the Y-polarization state (218). After the carrier is recovered, a constellation of the BPSK signal and constellations of the QPSK signal of the X-polarization and the Y-polarization may be obtained. The signal-to-noise ratios of the two polarization directions may be obtained from the above constellations and the histogram of the variance, and the final signal-to-noise ratio (i.e., a colored noise in the signal bandwidth) may be obtained after averaging. Since the optical signal-to-noise ratio is defined as a ratio of the signal to the noise (i.e., the white noise in a bandwidth of 0.1 nm), the calculated signal-to-noise ratio needs to be converted into the optical signal-to-noise ratio (219). The polarization dependent loss may be estimated (220) from a difference between the signal-to-noise ratios in the two polarization directions. Finally, the dispersion value, the polarization mode dispersion value, the optical signal-to-noise ratio and the polarization dependent loss value that are obtained are output by a display module, i.e., user interface (221), and the process is ended (222).

By the system according to the embodiment of the invention, simultaneously measuring various key performance parameters of the 40 Gbps, 100 Gbps and beyond-100 Gbps coherent polarization multiplexing system is achieved. In particular, the issue of measuring the in-service in-band OSNR is solved. Moreover, the network operation and maintenance are facilitated, and the cost of the network operation and maintenance is saved.

Figure 10:
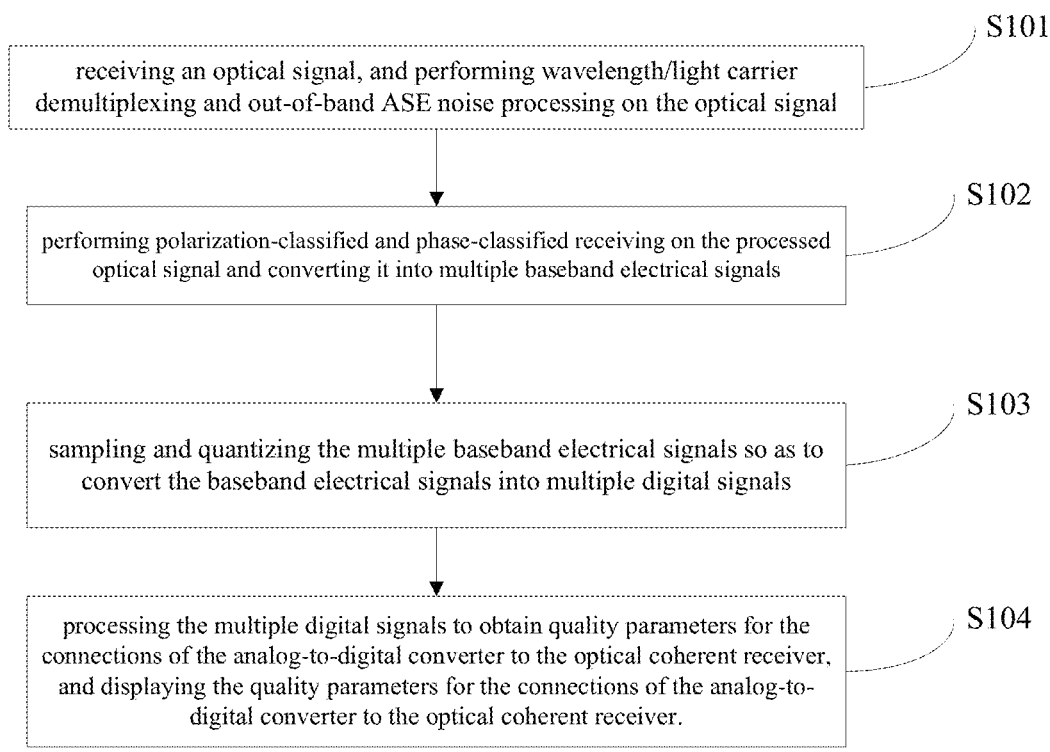
FIG. 10 illustrates a flow chart of a method for measuring quality parameters of optical transmission channels according to an embodiment of the invention.

FIG. 10 is an illustration of the flow chart of a method for measuring quality parameters of optical transmission channels according to an embodiment of the invention. As shown in FIG. 10, the method for measuring the quality parameters of the optical transmission channel according to the embodiment of the invention includes the following steps.

Step S101: a step of receiving an optical signal and performing wavelength demultiplexing and out-of-band ASE noise suppression.

In an embodiment of the invention, when an optical power of the optical signal is below the sensitivity of the optical coherent receiver, the optical signal will be amplified, and then wavelength demultiplexing is performed on the amplified optical signal and the out-of-band ASE noise is suppressed.

Step S102: a step of performing polarization- and phase-diversity detection of the optical signal, and converting it into multiple lane baseband electrical signals.

Step S103: a step of sampling and quantizing the multiple lane baseband electrical signals so as to convert these baseband electrical signals into multiple lane digital signals.

Step S104: a step of processing the multiple lane digital signals to obtain the quality parameters of the optical transmission channel and displaying the quality parameters of the optical transmission channel. The quality parameters include a dispersion value, a polarization mode dispersion value, an optical signal-to-noise ratio and a polarization dependent loss value.

Specifically, the dispersion value is estimated by a dispersion estimator from the multiple lane digital signals, where a function of a timing tone and a dispersion equalization filter are used to estimate the dispersion value. Then, the polarization mode dispersion value is estimated by a polarization mode dispersion estimator from the multiple lane digital signals. Thereafter, the optical signal-to-noise ratio is estimated by an optical signal-to-noise ratio estimator from the multiple lane digital signals. Finally, the polarization loss value is estimated by a polarization loss estimator from the multiple lane digital signals.

By the method according to the embodiment of the invention, simultaneously measuring various key performance parameters of the 40 Gbps, 100 Gbps and beyond-100 Gbps coherent polarization multiplexing system is achieved. In particular, the issue of measuring the in-service in-band OSNR is solved. Moreover, the network operation and maintenance are facilitated, and the cost of the network operation and maintenance is saved.

It should be understood that, the specific descriptions of the method embodiment of the invention is the same as that of the operating and processing for modules and units in the apparatus embodiment, and further detailed description will be omitted.

Although embodiments of the invention have been illustrated and described above, it may be understood that the above embodiments are exemplary only, rather than being construed as limiting the invention. Various changes, modifications, substitutions and variations can be made to the above embodiments by one of ordinary skills in the art without departing from the principle and spirit of the invention.

What is claimed is:

1. An apparatus for measuring quality parameters of an optical transmission channel, wherein the apparatus comprises:
   a tunable optical filter for processing an incoming optical signal, performing wavelength or optical carrier demultiplexing on the optical signal and the out-of-band ASE noise suppression;
   an optical coherent receiver connected to the tunable optical filter, for performing polarization- and phase-diversity detection of the optical signal processed by the tunable optical filter and converting it into multiple lane baseband electrical signals;
   analog-to-digital converters connected to the optical coherent receiver and operating in a burst mode, for sampling and quantizing the multiple lane baseband electrical signals to convert them into multiple lane digital signals;
   a digital signal processing module connected to the analog-to-digital converters, for processing the multiple lane digital signals to obtain the quality parameters of the optical transmission channel; and
   a display module for displaying the quality parameters of the optical transmission channel,
   wherein the digital signal processing module comprises:
      a dispersion estimator for estimating dispersion from the multiple lane digital signals;
      a polarization mode dispersion estimator for estimating polarization mode dispersion from the multiple lane digital signals;
      an optical signal-to-noise ratio estimator for estimating optical signal-to-noise ratio from the multiple lane digital signals; and
      a polarization dependent loss estimator for estimating polarization dependent loss value from the multiple lane digital signals.

2. The apparatus for measuring the quality parameters of the optical transmission channel according to claim 1, wherein the apparatus further comprises an optical amplifier connected to the tunable optical filter, for amplifying the optical signal and delivering the amplified optical signal to the tunable optical filter, when an optical power of the optical signal is below the sensitivity of the optical coherent receiver.

3. The apparatus for measuring the quality parameters of the optical transmission channel according to claim 1, wherein the quality parameters of the optical transmission channel comprises dispersion, polarization mode dispersion, optical signal-to-noise ratio and polarization dependent loss.

4. A method for measuring quality parameters of optical transmission channels, wherein the method comprises the following steps of:

receiving an optical signal with dual polarization and performing wavelength demultiplexing and out-of-band ASE noise suppression on the optical signal to produce a processed optical signal;

performing polarization- and phase-diversity detection on the processed optical signal and converting it into multiple lane baseband electrical signals with dual polarization;

sampling and quantizing the multiple baseband electrical signals so as to convert these baseband electrical signals into multiple lane digital signals with dual polarization; and processing the multiple lane digital signals to obtain the quality parameters of the optical transmission channel, and displaying the quality parameters of the optical transmission channel, wherein the processing of the multiple lane digital signals to obtain the quality parameters of the optical transmission channel comprises:

estimating a dispersion value by a dispersion estimator from the multiple lane digital signals with dual polarization;

estimating a polarization mode dispersion value by a polarization mode dispersion estimator from the multiple lane digital signals with dual polarization;

estimating an optical signal-to-noise ratio by an optical signal-to-noise ratio estimator from the multiple lane digital signals with dual polarization; and estimating a polarization dependent loss value by a polarization dependent loss estimator from the multiple lane digital signals with dual polarization.

5. The method for measuring the quality parameters of the optical transmission channel according to claim 4, wherein the method further comprises:

amplifying the optical signal, when the optical power of the signal is below the sensitivity of an optical coherent receiver.

6. The method for measuring the quality parameters of the optical transmission channel according to claim 4, wherein the quality parameters of the optical transmission channel comprises dispersion, polarization mode dispersion, optical signal-to-noise ratio and polarization dependent loss.

* * * * *